United States Patent [19]

Hill

[11] Patent Number: 4,537,412
[45] Date of Patent: Aug. 27, 1985

[54] MULTI-SEASON SKI SLED

[76] Inventor: Walter F. Hill, P.O. Box 116, Crown Point, N.Y. 12928

[21] Appl. No.: 638,121

[22] Filed: Aug. 6, 1984

[51] Int. Cl.³ .............................................. A63C 5/02
[52] U.S. Cl. ....................................... 280/7.12; 280/8; 280/12 F; 280/12 K; 280/15; 280/24; 280/87.01
[58] Field of Search ................. 280/7.12, 7.13, 8, 603, 280/11.1 BT, 818, 12 F, 12 K, 12 KL, 12 L, 13, 15, 24, 18, 87.04 R, 87.01

[56] References Cited

U.S. PATENT DOCUMENTS

| | | | |
|---|---|---|---|
| 1,330,644 | 2/1920 | Matson | 280/7.12 |
| 3,003,778 | 10/1961 | Taggart | 280/12 K |
| 3,057,634 | 10/1962 | Long | 280/7.12 |
| 3,190,668 | 6/1965 | Husak | 280/12 K |
| 3,506,279 | 4/1970 | Lambert | 280/12 F |
| 3,695,626 | 10/1972 | Alexander | 280/12 |
| 3,705,730 | 12/1972 | Bergsland | 280/24 |
| 4,262,919 | 4/1981 | Krent | 280/24 |
| 4,440,408 | 4/1984 | Velman | 280/12 KL |

FOREIGN PATENT DOCUMENTS 1015536  10/1952  France ...................... 280/11.1 BT Primary Examiner—David M. Mitchell
Attorney, Agent, or Firm—Walter F. Wessendorf, Jr.

[57] ABSTRACT

Disclosed is a ski sled for skiing or sledding with detachably mountable wheel assemblies for conversion to scooting use. The ski sled has identical and interchangeable ski members for assembling the ski members in tandem relationship, in side-by-side relationship or in a combination of tandem and side-by-side relationships.

3 Claims, 7 Drawing Figures

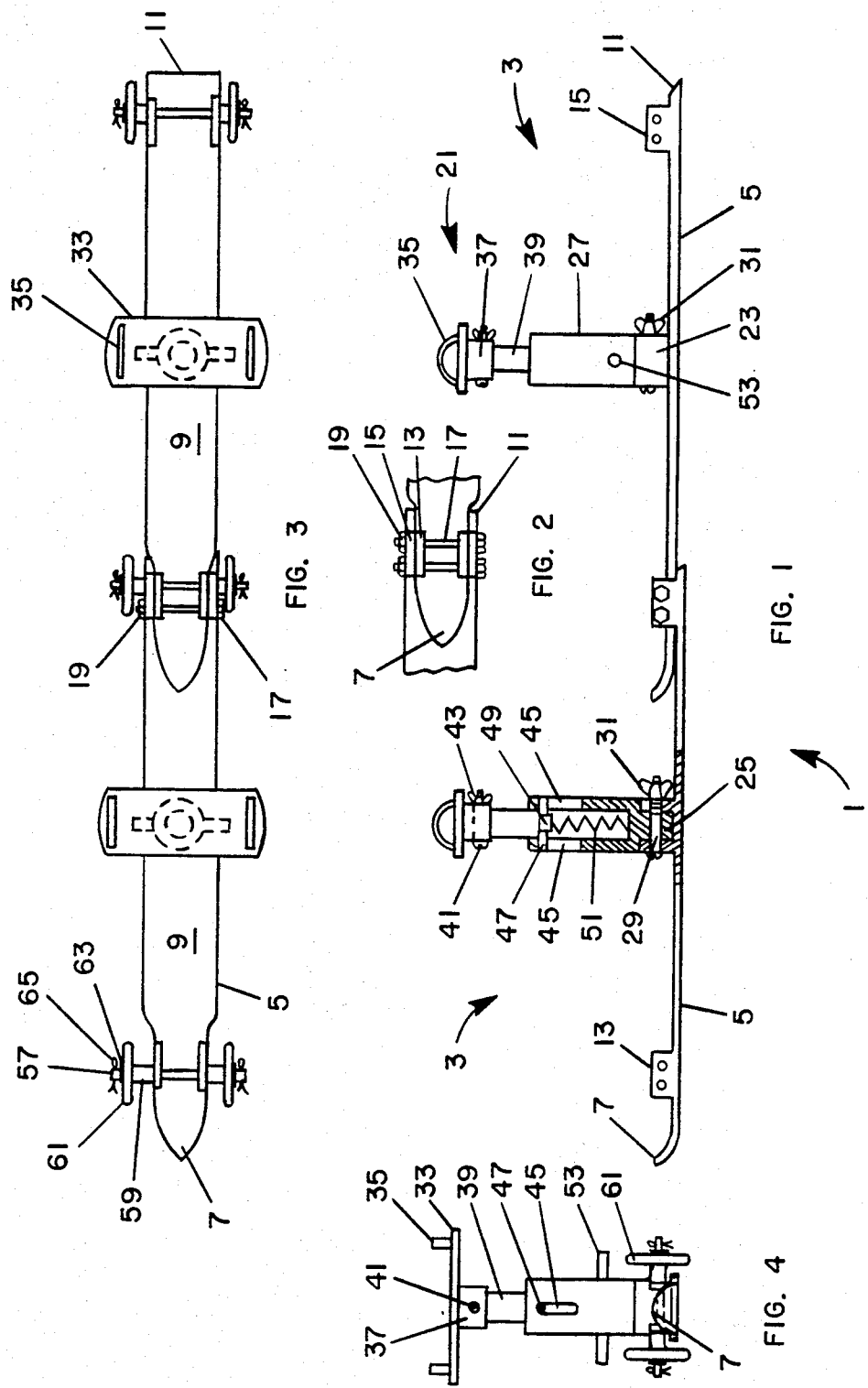

4,537,412

MULTI-SEASON SKI SLED

BACKGROUND OF THE INVENTION

1. Technical Field

This invention relates to a multi-season ski sled for use in the skiing and sledding. The ski sled of this invention is not used for conventional skiing where one's feet are fixed to runners that are free to move with relation to each other, forward and backward, apart and together, and in any combination of these movements. The terminology "skiing" in this disclosure refers to the use of a runner for sliding over the snow or the use of runners in fixed parallel or tandem relationship, or both tandem and parallel relationship, in which the feet are not fixed to the runner or runners.

2. Background Art

The prior art, U.S. Pat. No. 3,695,626, discloses a uni-runner recreation device; U.S. Pat. No. 3,705,730 discloses a coasting device; and U.S. Pat. No. 4,262,919 discloses an articulated body-steerable sled with add-on modules.

SUMMARY OF THE INVENTION

The object of this invention is to provide a multi-season ski sled that can be used for skiing or sledding. Detachably mounted wheel assemblies convert the ski sled for scooting use. The ski sled is made up of one ski member or several ski members. Each ski member is identical and interchangeable with another and coupling means allows two or more ski members to be formed and assembled into a rigid train of two or more ski members in tandem relationship, or for two or more ski members to be formed and assembled into rigid side-by-side relationship, or for a combination of ski members to be formed in both tandem and side-by-side relationships. Similarly, such detachably mounted wheel assemblies allow the ski members in tandem relationship to be converted for scooting use, the ski members in side-by-side relationship to be converted for scooting use, and, likewise, the ski members in both tandem and side-by-side relationships to be converted for scooting use.

BRIEF DESCRIPTION OF THE DRAWINGS

This object and other objects of the invention should be discerned and appreciated by reference to the drawings, wherein like reference numerals refer to similar parts throughout the several views, in which:

FIG. 1 is a side view of the ski sled with two ski members shown assembled in tandem relationship; FIG. 2 is a partial top view showing coupling means; FIG. 3 is a top view of the ski sled with wheel assemblies mounted thereon; FIG. 4 is a front view of the ski sled.

DESCRIPTION OF THE PREFERRED EMBODIMENT

Figure 6:
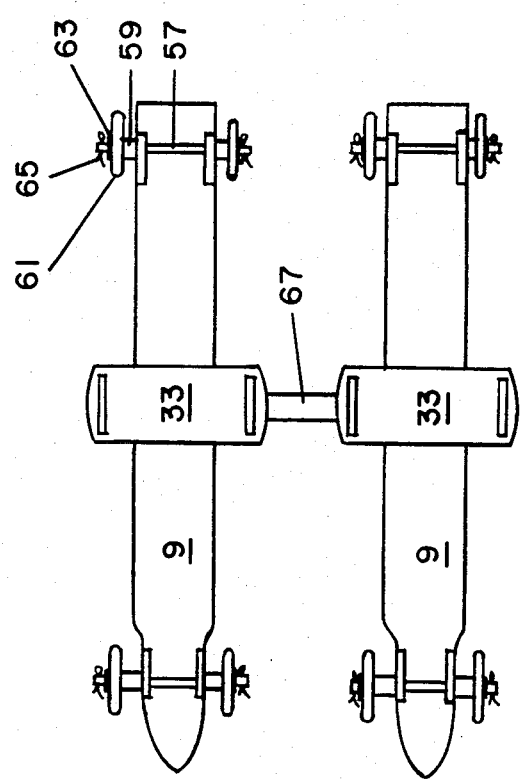
FIG. 6 is a top view of the ski sled with two ski members shown assembled in side-by-side relationship.
Figure 5:
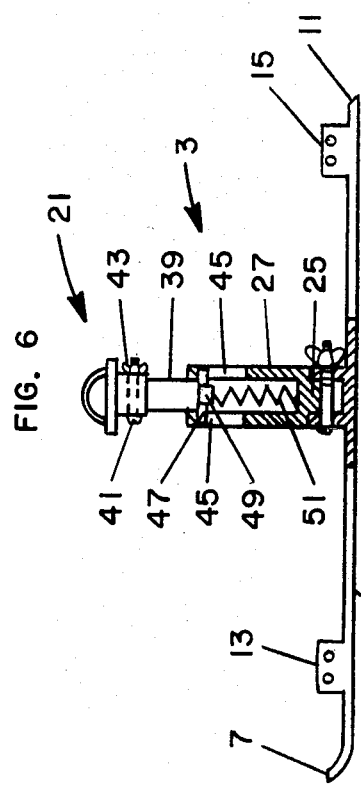
FIG. 5 is a side view of a ski member.
Figure 7:
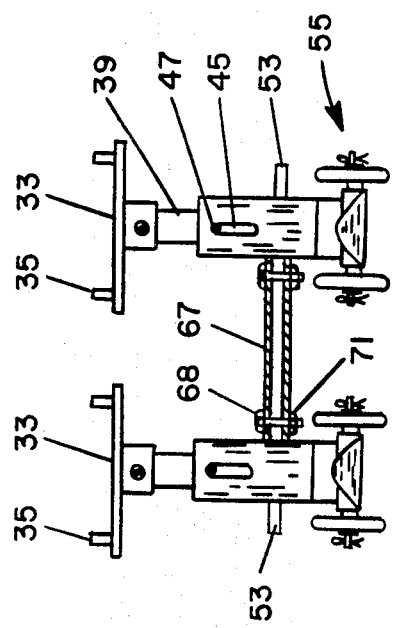
FIG. 7 is a front view of the ski sled with two ski members shown assembled in side-by-side relationship.

To facilitate the understanding of the invention, a nomenclature list is herewith provided, to wit:

1 generally refers to the invention
3 ski member
5 narrow runner of ski member 3
7 curved tip of runner 5
9 flat main portion of runner 5
11 heel portion of runner 5
13 toe bracket of runner 5
15 heel bracket of runner 5
17 bolt
19 nut
21 seat assembly
23 collar of seat assembly 21
25 tongue of tubular post 27
27 hollow, tubular post
29 bolt
31 wing nut
33 flat seat of seat assembly 21
35 upstanding lateral hand hold of seat 33
37 post collar of seat 33
39 shaft of seat assembly 21
41 bolt
43 wing nut
45 elongated vertical guide slot in tubular post 27
47 cross pin in shouldered portion 49
49 shouldered portion of shaft 39
51 compression spring in tubular post 27
53 foot rest on tubular post 27
55 wheel assembly
57 shaft of wheel assembly 55
59 spacer washer of wheel assembly 55
61 wheel of wheel assembly 55
63 washer of wheel assembly 55
65 cotter pin of wheel assembly 55
67 sleeve
69 bolt
71 wing nut In FIG. 1 of the drawings, reference numeral 1 generally refers to the ski sled invention shown assembled in tandem relationship. Ski sled 1 has two identical and interchangeable ski members 3 of plastic or other suitable material. Ski member 3 has a single, elongated, relatively narrow runner 5 having a upwardly curved tip or toe 7, a flat main portion 9 and a terminating heel portion 11.

Upstanding from the lateral sides of runner 5 are toe brackets having two sets of aligned holes and upstanding from the lateral sides of runner 5 are heel brackets 15 having two sets of aligned holes. As shown in FIGS. 2 and 3, the toe brackets 13 fit within the heel brackets 15 and are rigidly joined together by bolts 17 inserted through such aligned holes and secured by nuts 19 engaged and tightened upon the threaded ends of bolts 17.

Each ski member 3 has a seat assembly 21 comprising a collar 23, upstanding from the bight portion of main portion 9, which complementally receives a tongue 25 depending from a hollow, tubular post 27 which is removably fixed thereto by a bolt 29 inserted through aligned holes in the tongue 25 and tubular post 27, and secured by a wing nut 31 engaged and tightened upon the threaded end of bolt 29.

A flat seat 33, with upstanding lateral hand holds 35 in fixed relationship therewith, has fixed thereto in depending relationship a post collar 37 which complementally receives a shaft 39 in fixed relationship via a bolt 41 inserted through aligned holes in the post collar 37 and shaft 39, and secured by a wing nut 43 engaged and tightened upon the threaded end of bolt 41.

Elongated vertical guide slots 45 in tubular post 27 receive a cross pin 47 fixedly carried in transverse relationship on the bottom shouldered portion 49 of shaft 39 by interference fit through a transverse hole in shouldered portion 49.

A compression spring 51 operatively disposed between the bottom of hollow, tubular post 27 and shouldered portion 49, functions as a shock absorber to absorb and attenuate the impacts transmitted when runner 5 hits a bump.

Cross pins 53, in transverse relationship with tubular post 27 and extending outwardly therefrom, function as foot rests upon which a rider places his feet.

Wheel assemblies 55 may be utilized with the toe and heel brackets 13 and 15 to convert a ski member 3 for scooting use, or may be utilized with such toe and heel brackets 13 and 15 of ski sled 1, assembled in its tandem relationship, to convert same to scooting use.

Each wheel assembly 55 comprises a shaft 57, two spacer washers 59, two wheels 61, two washers 63 and two cotter pins 65.

For scooting use of a ski member 3, one shaft 57, two spacer washers 59, two wheels 61, two washers 63 and two cotter pins 65 would be assembled with respect to one of the aligned holes in each of the toe and heel brackets 13 and 15, as shown in FIG. 6.

For scooting use of a ski sled assembled of two ski members 3 assembled in tandem relationship, three wheel assemblies 55 would be employed and assembled as shown in FIG. 3.

In FIG. 6 of the drawings, two ski members 3 are shown assembled in side-by-side relationship. Such assembly is accomplished by a sleeve 67 which complementally receives therein opposed cross pins 53. Fixed relationship of the sleeve 67 and cross pins 53 is effected via bolts 69 inserted through aligned holes in the sleeve 67 and cross pins 53, and secured in rigid relationship by wing nuts 71 engaged and tightened upon the threaded ends of the bolts 69.

From the description of the assembly of two ski members 3 in tandem relationship, it should be self-evident that three or more ski members 3 can be assembled in tandem relationship. From the description of the assembly of two ski members 3 in side-by-side relationship, it should be self-evident that three or more ski members 3 can be assembled in side-by-side relationship. And from the descriptions of the assemblies of the ski members 3 in their tandem and side-by-side relationships, the assembly of the ski members 3 in the combination of tandem and side-by-side relationships should be self-evident.

To utilize the ski member 3, a rider simply sits on the seat 33, grasps the hand holds 35, propels himself forward and appropriately places his feet on the foot rests 53. The same operation would be followed in unison when riders are utilizing the ski sled 1 of ski members 3 assembled in tandem, side-by-side, or combination relationships.

Having thusly described my invention, I claim:

1. A ski sled for skiing and sledding, comprising identical and interchangeable ski members for assembling said ski members in tandem relationship, or for assembling said ski members in side-by-side relationship, or for assembling said ski members in a combination of both tandem and side-by-side relationships; each ski member having a seat assembly for a rider, each ski member having a fore or toe end and an aft or rear end, each ski member having forward or toe and rear or heel brackets at said fore and aft ends, respectively, and in the assembly of said ski members in tandem relationship: one of said ski members being a leading ski member and the other of said ski members being a trailing ski member, and said forward bracket on said trailing ski member being connected to said rear bracket on said leading ski member; and said ski members having coupling means for connecting said ski members in side-by-side relationship.

2. A ski sled in accordance with claim 1, wherein each seat assembly has foot rests, and wherein said coupling means comprise sleeve and fastening means, and, in the assembly of said ski members in side-by-side relationship: said sleeve means receiving said foot rests and said fastening means connecting said foot rests and sleeve means.

3. A ski sled in accordance with claim 1, wherein are further provided wheel assemblies, each of said wheel assemblies comprising wheels and mounting means for detachably mounting said wheels on said forward and rear brackets to convert said ski sled for scooting use of said ski sled assembled in either or both tandem and side-by-side relationships.

* * * * *